employed(12) United States Patent
Pfeiffer et al.

(10) Patent No.: US 10,729,065 B2
(45) Date of Patent: Aug. 4, 2020

(54) AUGMENTED CROP LOSS SENSING

(71) Applicant: Deere & Company, Moline, IL (US)

(72) Inventors: Dohn W. Pfeiffer, Bettendorf, IA (US); Douglas J. Bollin, Port Byron, IL (US); Lutz Bischoff, Nuenschweiler (DE)

(73) Assignee: Deere & Company, Moline, IL (US)

(*) Notice: Subject to any disclaimer, the term of this patent is extended or adjusted under 35 U.S.C. 154(b) by 1169 days.

(21) Appl. No.: 14/849,930

(22) Filed: Sep. 10, 2015

(65) Prior Publication Data

US 2017/0071125 A1   Mar. 16, 2017

(51) Int. Cl.
*A01D 34/00* (2006.01)
*A01D 41/127* (2006.01)
*A01F 12/44* (2006.01)
*A01D 101/00* (2006.01)

(52) U.S. Cl.
CPC ....... *A01D 34/006* (2013.01); *A01D 41/1273* (2013.01); *A01F 12/444* (2013.01); *A01D 2101/00* (2013.01)

(58) Field of Classification Search
CPC .............. A01D 41/1273; A01D 34/006; A01D 34/008; A01D 41/127; A01D 41/1271; A01D 41/1272; A01F 12/444
See application file for complete search history.

(56) References Cited

U.S. PATENT DOCUMENTS

| | | | | |
|---|---|---|---|---|
| 3,935,866 A | * | 2/1976 | Northup | A01D 41/1273 460/4 |
| 4,208,858 A | * | 6/1980 | Rowland-Hill | A01F 7/06 460/100 |
| 4,481,756 A | * | 11/1984 | Schartz | A01D 41/1273 460/5 |
| 4,875,889 A | * | 10/1989 | Hagerer | A01D 75/282 460/1 |
| 4,934,985 A | * | 6/1990 | Strubbe | A01D 41/127 460/4 |
| 4,951,031 A | * | 8/1990 | Strubbe | A01D 41/1273 340/684 |
| 5,775,072 A | | 7/1998 | Herlitzius et al. | |

(Continued)

FOREIGN PATENT DOCUMENTS

| | | |
|---|---|---|
| EP | 1321023 A1 | 6/2003 |
| EP | 1321024 A1 | 6/2003 |
| EP | 3056076 A1 | 8/2016 |

OTHER PUBLICATIONS

Extended EP Search Report Application No. 16184276.0 dated Mar. 2, 2017, 7 pages.

*Primary Examiner* — Thomas B Will
*Assistant Examiner* — Joan D Misa
(74) *Attorney, Agent, or Firm* — Christopher J. Volkmann; Kelly, Holt & Christenson, PLLC

(57) ABSTRACT

A crop loss correction system receives one or more crop loss sensor signals that are indicative of crop lost by a harvesting machine. A correction component receives context information from a set of context sensing components to identify a context of the harvesting machine. The correction component corrects the crop loss sensor signals, based upon the context information, to obtain a corrected loss signal indicative of the sensed crop loss, corrected based on the mobile machine context. The corrected loss signal is output to an output device.

20 Claims, 9 Drawing Sheets

(56) References Cited

U.S. PATENT DOCUMENTS

| | | | | |
|---|---|---|---|---|
| 5,995,895 | A * | 11/1999 | Watt | A01B 79/005 56/10.2 G |
| 6,119,442 | A * | 9/2000 | Hale | A01D 41/1277 56/10.2 H |
| 6,591,145 | B1 * | 7/2003 | Hoskinson | A01D 41/127 460/1 |
| 6,592,453 | B2 | 7/2003 | Coers et al. | |
| 7,572,180 | B2 * | 8/2009 | Ricketts | A01D 75/282 460/101 |
| 7,584,663 | B2 | 9/2009 | Missotten et al. | |
| 7,630,809 | B2 * | 12/2009 | Behnke | A01D 41/127 56/10.2 R |
| 8,428,830 | B2 * | 4/2013 | Diekhans | A01D 41/127 701/50 |
| 9,629,308 | B2 * | 4/2017 | Scholer | G01F 1/662 |
| 10,049,296 | B2 * | 8/2018 | Walker | A01D 41/127 |
| 10,111,386 | B2 * | 10/2018 | Farley | A01D 75/282 |
| 2004/0186597 | A1 | 9/2004 | Wippersteg et al. | |
| 2005/0137003 | A1 | 6/2005 | Behnke et al. | |
| 2015/0080069 | A1 * | 3/2015 | Fuchs | A01D 41/1272 460/1 |
| 2015/0080070 | A1 | 3/2015 | Johnson | |
| 2016/0000008 | A1 * | 1/2016 | Scholer | G01F 1/662 56/10.2 R |
| 2016/0327535 | A1 * | 11/2016 | Cotton | A01D 41/1273 |
| 2017/0231156 | A1 * | 8/2017 | Aesaert | A01F 12/448 460/5 |
| 2018/0120133 | A1 * | 5/2018 | Blank | G01D 18/002 |

* cited by examiner

AUGMENTED CROP LOSS SENSING

FILED OF THE DESCRIPTION

The present description relates to agricultural sensing. More specifically, the present description relates to crop loss sensing in a harvesting machine.

BACKGROUND

There are a wide variety of different types of harvesting machines that harvest crops. Some such machines include sensors that attempt to sense crop loss.

The crop loss sensors generate a sensor signal that is indicative of an amount of crop that is lost during the harvesting operation. For instance, some current agricultural operations use combines to harvest grain. It is common for combines to include loss sensors that sense some type of metric that can be indicative of the amount of the harvested crop being lost during the harvesting operation. The loss sensors can include a set of sensors that monitor grain loss from various parts of the combine. The sensors can include, for instance, a set of shoe loss sensors that sense grain loss from the cleaning shoe. They can also include a set of separator loss sensors that sense loss from the separator. There are a variety of different kinds of sensors. Such sensors can include, for instance, strike sensors that count grain strikes per unit of time (or per unit of distance travelled) to provide an indication of the amount of grain lost.

The discussion above is merely provided for general background information and is not intended to be used as an aid in determining the scope of the claimed subject matter.

SUMMARY

A crop loss correction system receives one or more crop loss sensor signals that are indicative of crop lost by a harvesting machine. A correction component receives context information from a set of context sensing components to identify a context of the harvesting machine. The correction component corrects the crop loss sensor signals, based upon the context information, to obtain a corrected loss signal indicative of the sensed crop loss, corrected based on the mobile machine context. The corrected loss signal is output to an output device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
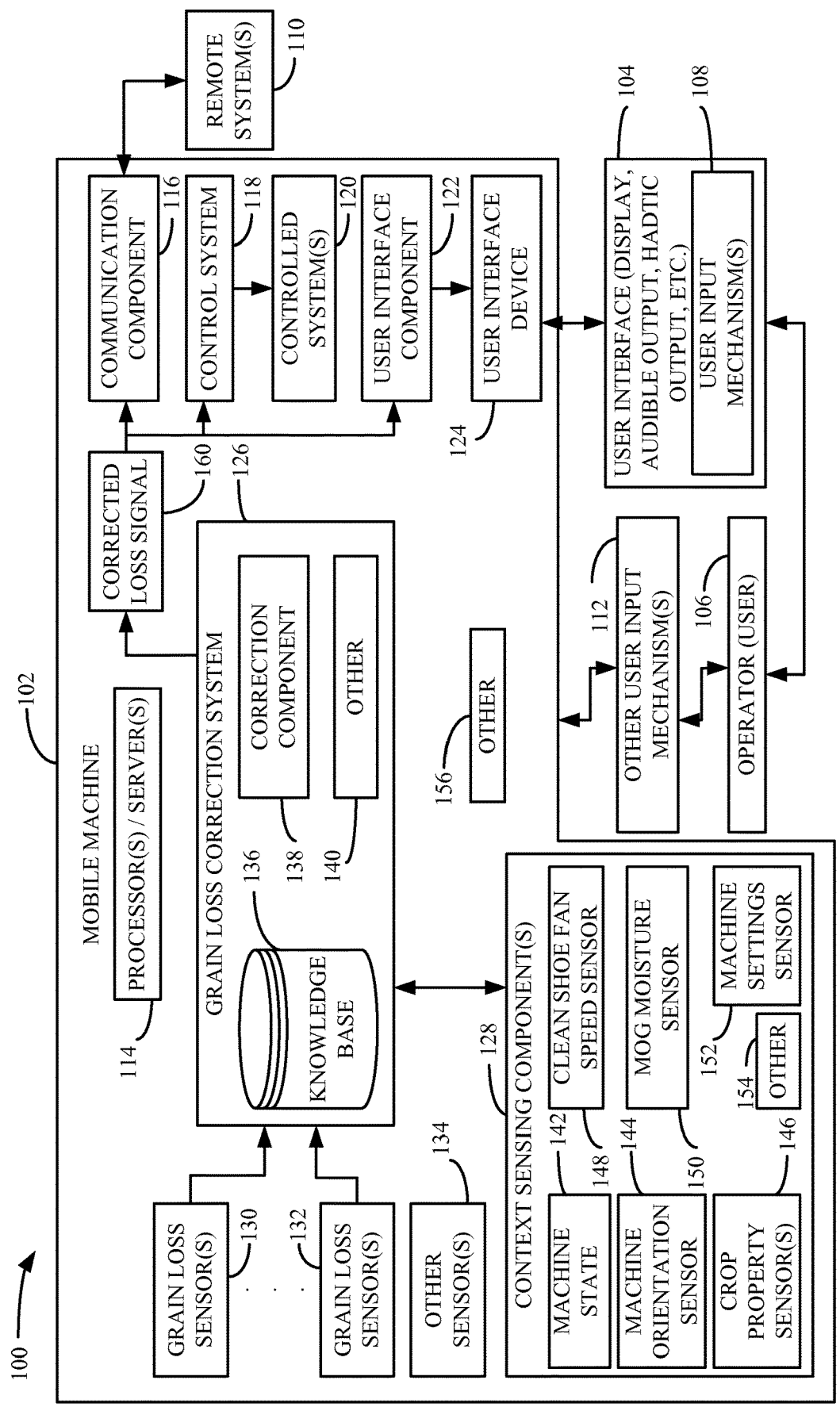
FIG. 1 is a block diagram of one example of a crop loss correction architecture.

FIG. 1 is a block diagram of one example of a crop loss correction architecture 100. Architecture 100 shows mobile machine 102 generating user interfaces 104 for interaction by user (or operator 106). User interfaces 104 can include user interface displays, audible outputs, haptic outputs, etc. It can also include a set of user input mechanisms 108. User 106 illustratively interacts with user input mechanisms 108 in order to control and manipulate various portions of mobile machine 102. Architecture 100 also shows that mobile machine 102 can be connected to various remote systems 110. User 106 can also use other user input mechanisms 112 to interact with mobile machine 102.

User input mechanisms 108 can be displayed on user interface displays 104. Therefore, they can be touch sensitive display elements, icons, links, etc. Other user input mechanisms 108 can be a whole host of user input mechanisms that can be used to control machine 102. These can include such things as switches, levers, push buttons, keypads, pedals, steering wheels, joysticks, etc.

In the example described herein, mobile machine 102 may be an agricultural harvesting machine, or it can be another type of machine (such as a tractor) that pulls an external harvesting machine. In the latter case, some or all of the components shown in mobile machine 102 may be on the external machine. However, the present description will proceed with respect to machine 102 being the harvester, itself. Also, it will be noted that the present discussion will proceed with respect to mobile machine 102 harvesting grain, but it could be harvesting other crops as well.

In the example shown in FIG. 1, mobile machine 102 illustratively (and by way of example only) includes one or more processors or servers 114, communication component 116, control system 118, controlled systems 120, user interface component 122, and user interface device 124. It also illustratively includes grain loss correction system 126, context sensing components 128, one or more grain loss sensors 130-132, and it can include a variety of other sensors 134. Grain loss correction system 126, itself, illustratively includes knowledge base 136, correction component 138, and it can include other items 140. Controlled systems 120 can include, for instance, electrical systems, mechanical systems, hydraulic systems, pneumatic systems, air-over-hydraulic systems, or other systems. These systems can perform harvesting functions and a wide variety of other functions on mobile machine 102. Context sensing components 128 can include a variety of sensors that sense information about machine 102, crop characteristics or other information that affects the accuracy of grain loss sensors 130-132 in sensing actual grain loss. Components 128 can thus include sensors such as machine state sensor 142, machine orientation sensor 144, crop property sensor 146, cleaning shoe fan speed sensor 148, material other than grain (MOG) moisture sensor 150, machine setting sensor 152, and it can include other items or sensors 154. Mobile machine 102 can include other items 156, as well.

Before describing the operation of architecture 100 in more detail, a brief overview of some of the items in architecture 100, and their operation, will first be provided. Where mobile machine 102 is a combine, grain loss sensors 130-132 can include one or more shoe loss sensors deployed to sense grain loss at the cleaning shoe. It can also include one or more separator loss sensors that are deployed to sense grain loss at the separator. It can include a variety of other grain loss sensors as well.

Grain loss correction system 126 illustratively receives the grain loss sensor signals from sensors 130-132. It will be noted that the grain loss sensor signals sometimes do not reflect the actual grain loss. Therefore, grain loss correction system 126 corrects the grain loss and provides a corrected loss signal 160. The corrected loss signal illustratively reflects the actual grain loss more accurately than the grain loss sensor signals.

In generating the corrected loss signal 160, grain loss correction system 126 illustratively receives context information from context sensing components 128 which indicates the context of mobile machine 102. As will be described in greater detail below, the context information can include a wide variety of different information that may bear on the accuracy of the signals received from grain loss sensors 130-132 in sensing actual grain loss. Knowledge base 136 illustratively includes corrective components, that can be used to correct the sensor signals received from sensors 130-132, in order to generate corrected loss signal 160, based upon the particular context of mobile machine 102. Therefore, correction component 138 illustratively receives the context information and accesses knowledge base 136 to make corrections to the sensor signals from sensors 130-132, and to thus generate corrected loss signal 160, which more closely reflects the actual grain loss. Signal 160 can then be provided to a wide variety of different components. For instance, it can be provided to communication component 116 which communicates the signal to remote systems 110. It can be provided to control system 118 which automatically generates control signals to control the various controlled systems 120 on mobile machine 102, based upon corrected grain loss signal 160. It can be provided to user interface component 122 which controls user interface device 124 to display the corrected grain loss signal, through some visual, audible, haptic, or other indicia, to operator 106.

Figure 2:
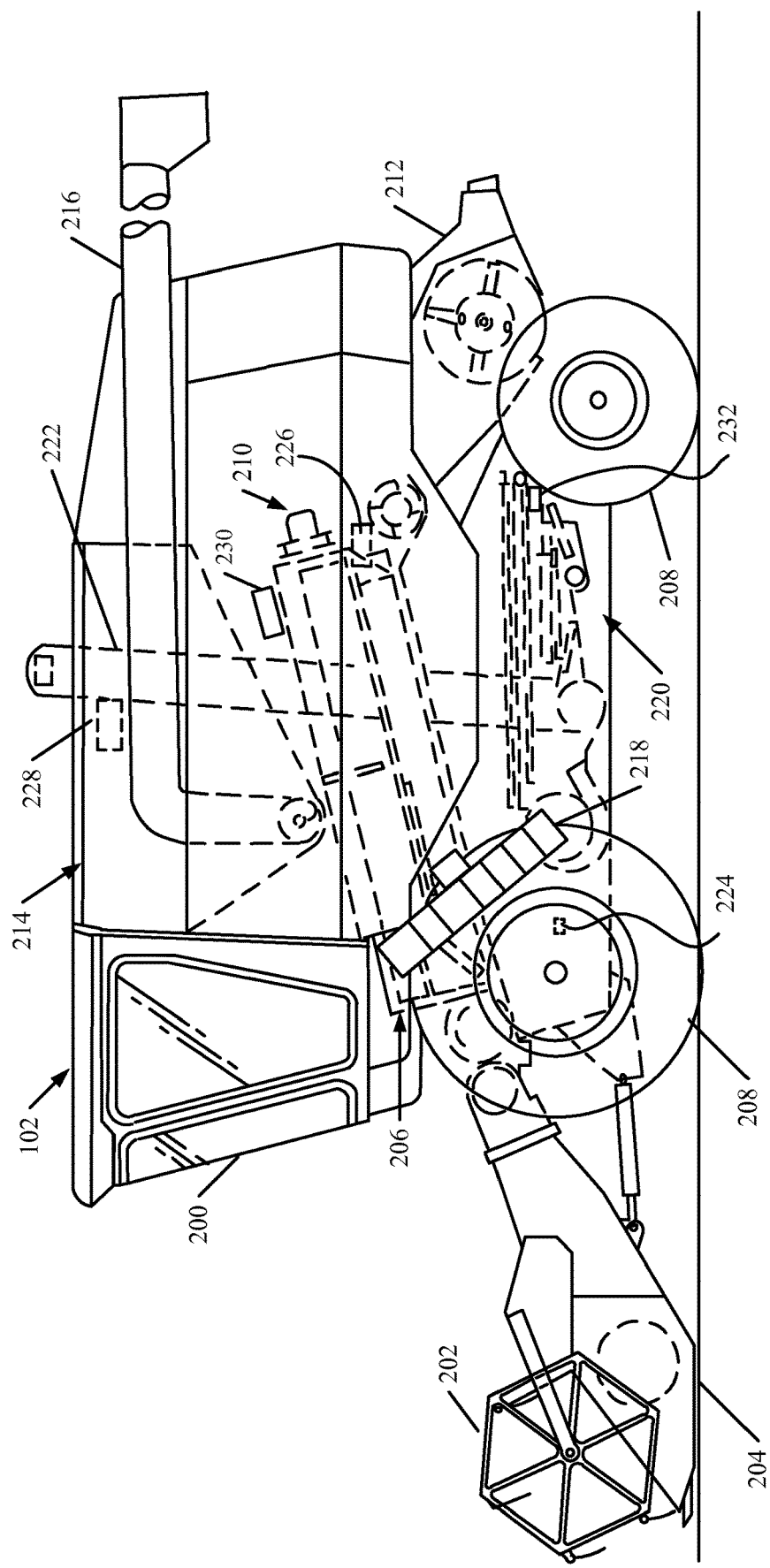
FIG. 2 is a pictorial illustration of one example of a portion of the architecture shown in FIG. 1, deployed on a combine.

FIG. 2 is a pictorial illustration in which mobile machine 102 is a combine. Thus, FIG. 2 illustrates some parts of architecture 100, in the context of a combine. It can be seen in FIG. 2 that combine 102 illustratively includes an operator compartment 200, header 202, a cutter generally indicated at 204, a thresher generally indicated at 206, a set of ground engaging wheels 208, a separator 210, a spreader 212, a clean grain tank indicated by arrow 214, a spout 216, a tailings elevator 218, cleaning shoe 220, and clean grain elevator 222. Header 202 engages the product being harvested and gathers it toward cutter 204. After it is cut, it is moved toward thresher 206 where it is threshed and then moved toward separator 210. The grain falls to cleaning shoe 220 and the clean grain is moved by clean grain elevator 222 into clean grain tank 214. Tailings can be passed back to thresher 206, using tailings elevator 218, where they are re-threshed. Alternatively, the tailings can also be passed to a separate re-threshing mechanism (also using a tailings elevator or another transport mechanism) where they can be re-threshed as well. Material other than grain (such as stalks, husks, etc.) can be chopped and removed from machine 102 by spreader 212.

FIG. 2 also shows, in one example, that combine 102 can include ground speed sensor 224, one or more separator loss sensors 226, a clean grain camera 228, a tailings camera 230, and one or more cleaning shoe loss sensors 232. Ground speed sensor 224 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 232 illustratively provide an output signal indicative of the quantity of grain loss by both the right and left sides of the cleaning shoe. In one example, sensors 232 are strike sensors which count grain strikes per unit of time (or per distance traveled) to provide an indication of the cleaning shoe grain loss. The strike sensors for the right and left sides of the cleaning shoe can provide individual signals, or a combined or aggregate signal. It will be noted that sensors 232 can comprise only a single sensor as well, instead of separate sensors for each shoe.

Separator loss sensors 226 provide a signal indicative of grain loss in the left and right separators 210. The sensors associated with the left and right separators 210 can provide separate grain loss signals, or a combined or aggregate signal. This can be done using a wide variety of different types of sensors as well. It will be noted that separator loss sensors 226 may also comprise only a signal sensor, instead of separate left and right sensors.

It will also be appreciated that the context sensing components 128 (shown in FIG. 1) while not specifically shown in the pictorial illustration of FIG. 2, can be included on combine 102 as well. For instance, machine state sensor 142 may be configured to sense whether machine 102 is configured to chop the residue, or drop a windrow. Cleaning shoe fan speed sensor 148 can be configured proximate cleaning shoes 220 to sense the speed of the fan. MOG moisture sensor 150 can be configured to sense the moisture level of the material other than grain that is passing through machine 102. Machine setting sensor 152 can include one or more sensors that are configured to sense the various configurable settings on machine 102. Machine orientation sensor 144 can include a wide variety of different types of sensors that can sense the orientation of machine 102. Crop property sensors 146 can be sensors that are configured to sense a wide variety of different types of crop properties, such as crop type, and other crop properties. Crop property sensor 146 may also be configured to sense crop characteristics as the crop is processed by machine 102. For instance, it can include a grain feed rate sensor. In one example, this is a sensor deployed in elevator 222 that senses mass flow through elevator 222 and that provides an output signal indicative of this. The mass flow rate may be used to represent mass flow and yield in bushels per hour, tons per hectare, tons per hour or in other units.

Figure 3:
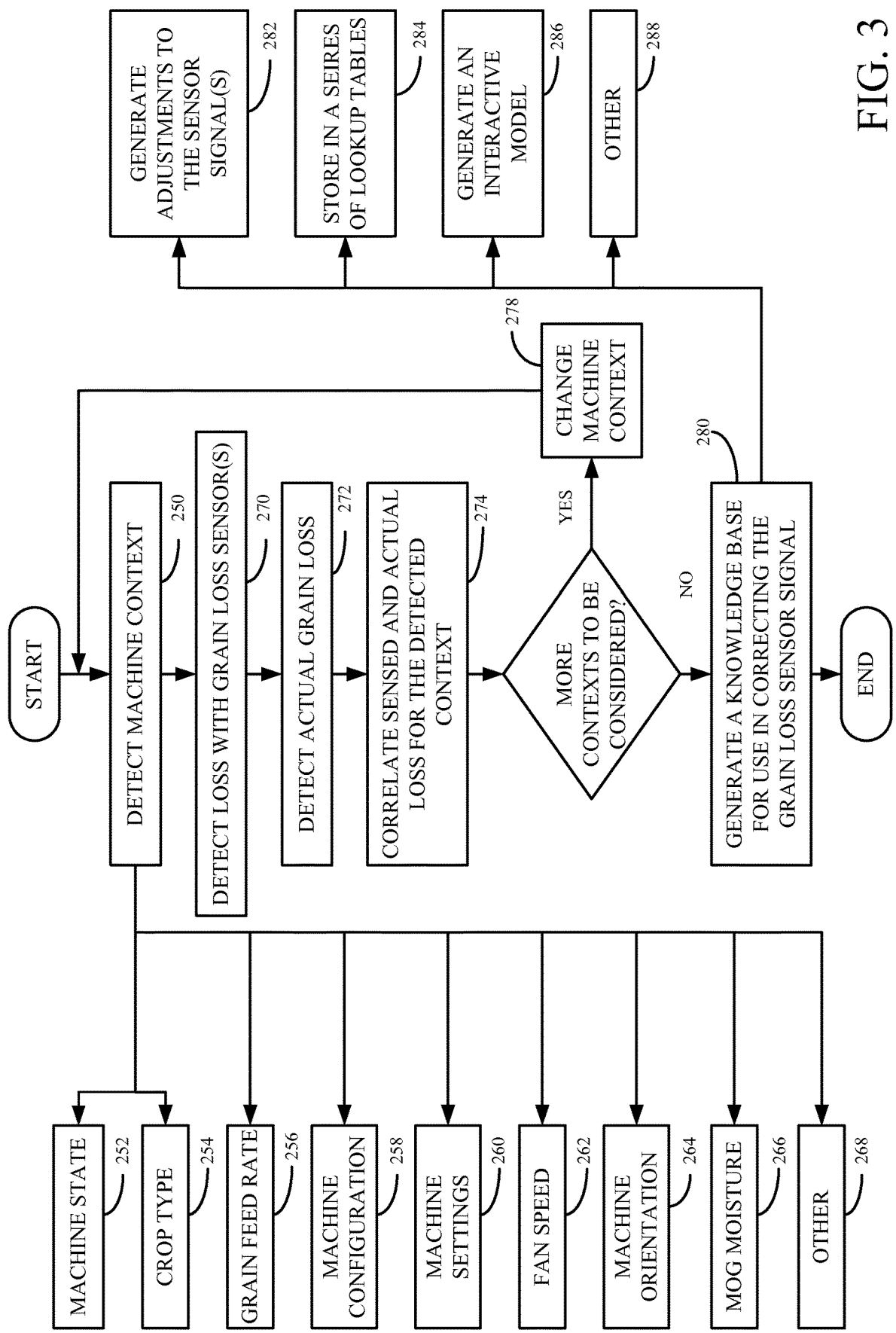
FIG. 3 is a flow diagram illustrating one example of generating a knowledge base that is used to correct crop loss sensor signals.

Before describing the overall operation of machine 102, a description of how grain loss correction system 126 is configured to generate corrected loss signal 160 will first be provided. FIG. 3 is a flow diagram illustrating one example of the operation of machine 102, as it can be controlled to generate knowledge base 136 in grain loss correction system 126. In one example, the values in knowledge base 136 are obtained without performing the operation in FIG. 3, such as by downloading them or otherwise obtaining them. In another example, the operation shown in FIG. 3 is performed to get values for knowledge base 136 and need not be repeated. Those values can be loaded onto other similar machines.

To generate knowledge base 136, machine 102 can first be configured so that it can sense actual grain loss. For instance, it can be fitted with an attachment or towed mechanism that collects all of the material coming out of machine 102. That material can then be weighed or otherwise analyzed to obtain a measure of actual grain loss, with a relatively high degree of accuracy. Then, the machine can be operated in different contexts to identify how the grain loss sensed by the grain loss sensors differs from the actual grain loss, in those different contexts. This information can then be used to generate correction elements in knowledge base 136, that can be used by correction component 138 to correct the grain loss sensor signals, based upon a current context in which machine 102 is operating, to obtain the corrected loss signal 160.

FIG. 3 thus shows that the machine context is first detected. This is indicated by block 250. In one example, the various different contexts that are detected are those which will most affect the accuracy of the grain loss sensed by grain loss sensors 130-132 (e.g., separator loss sensors 226 and shoe loss sensors 232). A number of examples of different contexts that will affect the accuracy of the sensed grain loss will now be discussed. It will be appreciated, however, that these are examples only and other contexts that affect the accuracy of any of the grain loss sensor signals can be detected and used as well.

The state of machine 102, with respect to whether it is configured to chop the residue or drop a windrow behind the machine and spread it, may affect the accuracy of the sensor signals from the grain loss sensors. That is, the ability to accurately sense grain loss using the grain loss sensors may change based upon whether the machine state is set for chopping or dropping a windrow. Thus, machine state sensor 142 can sense machine state 252.

Crop property sensor 146 can also sense a variety of different properties of the crop being harvested. An example of a property is the crop type 254. It may be, for instance, that the ability to accurately sense grain loss varies with crop type (e.g., corn, soybeans, wheat, barley, canola, etc.). Thus, the type of crop can be sensed or provided by the operator and used as context information.

It may also be that the grain feed rate 256 affects the ability to accurately sense grain loss. Thus, sensors 146 can include a mass flow sensor that senses grain feed rate in elevator 222, or another type of sensor that senses grain feed rate.

It may also be that machine 102 can have different configurations, and the particular machine configuration 258 may affect the ability to accurately sense grain loss. For instance, the machine may be configured with different separator mechanisms, and the ability to accurately sense grain loss may differ depending on the particular mechanism being used. Thus, machine state sensor 142 can also include a sensor that indicates the particular machine configuration 258.

The various machine settings (which can be configured by the operator) may affect the ability to accurately sense grain loss as well. Thus, machine settings 260 can be sensed by machine settings sensor 152.

In one example, the fan speed 262 of the cleaning shoe fan also affects the ability to accurately sense grain loss. By way of example, if the fan speed is too high, this can cause some of the grain to become airborne with a trajectory that causes it to miss the cleaning shoe loss sensors. This type of grain loss will not be sensed. Therefore, fan speed sensor 148 can provide an indication of fan speed 262.

The particular orientation of machine 102 may also affect the ability to accurately sense grain loss. For instance, where the machine is exhibiting a roll characteristic (such as where it is harvesting on a side hill), this may result in a non-uniform shoe loss distribution across the width of the machine. The accuracy of the grain loss sensors may thus be affected. Therefore, machine orientation sensor 144 can sense machine orientation 264.

It may also be that the moisture level of the material other than grain may affect the ability to accurately sense grain loss. For instance, by way of example, when the material other than grain (MOG) has a relatively high moisture content, it can form a MOG mat as it is moved through combine 102. In that case, the amount of grain that can pass through the mat and be sensed by the sensors, may be affected. This can be exacerbated where the grain is relatively light, such as where the grain is wheat. Instead of being sensed, the grain is simply carried by the high moisture MOG mat out of the machine, and that lost grain is not sensed by any of the sensors. Thus, MOG moisture sensor 150 can sense MOG moisture 266.

Of course, a wide variety of other context sensors 154 can sense other contextual information 268 as well. All of that information can be used in generating knowledge base 136.

While the particular machine context is sensed, the machine is operated and grain loss is detected with the grain loss sensors 130-132 on the machine. This is indicated by block 270. The actual grain loss is also sensed (or otherwise determined) as indicated by block 272. Then, the sensed and actual grain loss for the present machine context are correlated to identify any error in the sensed grain loss, relative to the actual grain loss. This is indicated by block 274.

This process can be repeated for a variety of different contexts so that the relationship between the crop loss sensing error and those different contexts can be identified. Thus, at block 276 it is determined whether additional contexts are to be considered. If so, then the machine context is changed to the next context to be considered, at block 278, and processing returns to block 250.

Once all of the different machine contexts have been considered, then knowledge base 136 is generated for use in correcting the grain loss sensor signal, during runtime operation of machine 102. This is indicated by block 280. This can be done in a wide variety of different ways as well. For instance, knowledge base 136 can include a set of adjustment values that are applied to the grain loss sensor signals in order to adjust the sensor signals, based upon the machine context. This is indicated by block 282. In that case, during runtime, correction component 138 receives the runtime context information from components 128 and identifies an adjustment value in knowledge base 136 to adjust the grain loss sensor signals in order to generate the corrected loss signal 160.

In another example, knowledge base 136 can include a series of lookup tables 284. The lookup tables 284 may be used by correction component 138 to walk through a series of lookups and mathematical operations, based upon the context information received from components 128, and based upon the changes in that information. This can be used to identify adjustment values that can be applied to generate corrected loss signal 160.

In yet another example, knowledge base 136 includes an interactive model 286. In that example, correction component 138 can call into the interactive model, passing in the context information received from components 128 and the sensor signal values received from grain loss sensors 130-132, and the model can return either a correction value, or the corrected loss signal 160, itself. All of these, and a wide variety of other ways 288 for generating knowledge base 136 are contemplated herein.

Figure 4:
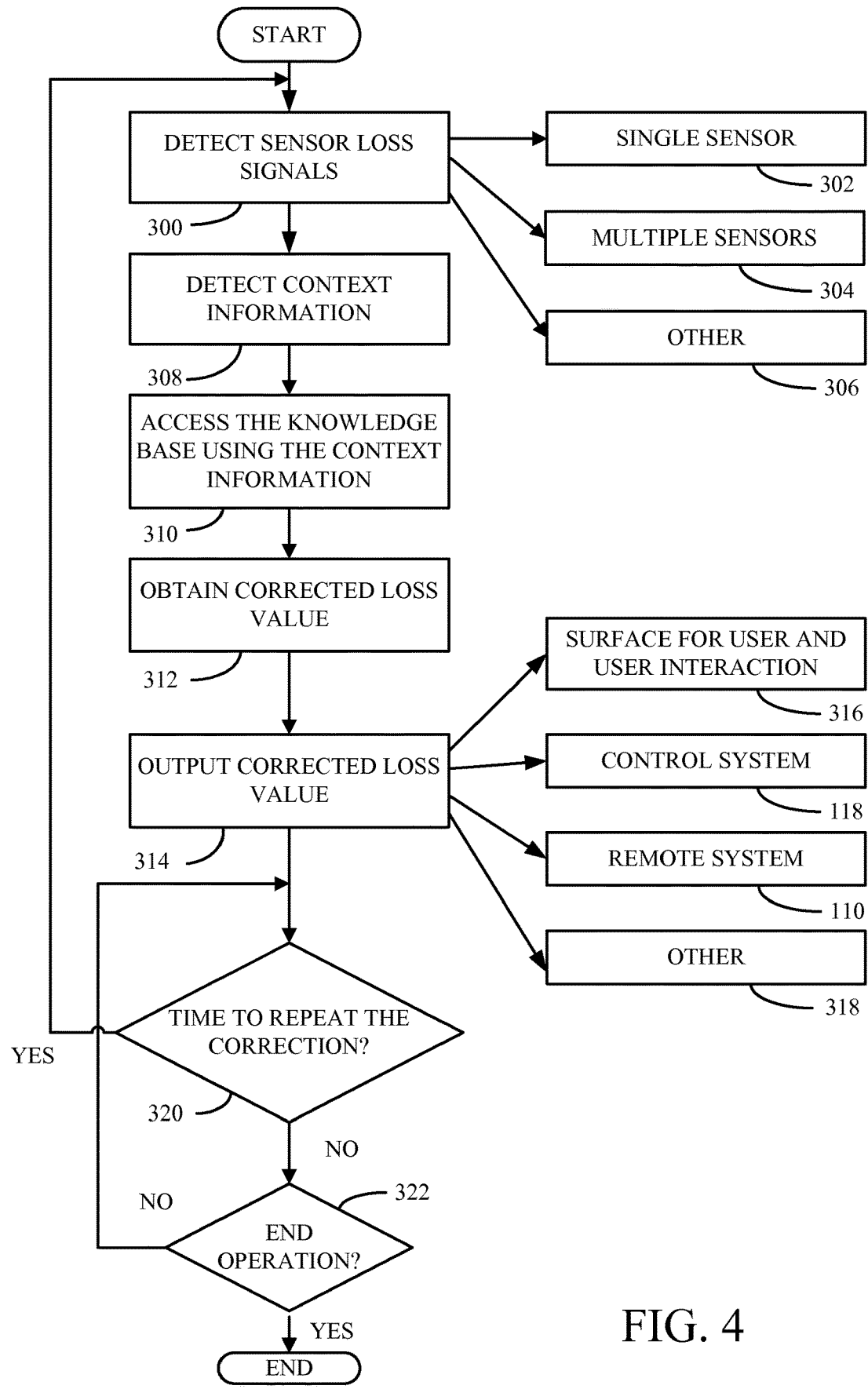
FIG. 4 is a flow diagram illustrating one example of the operation of the architecture shown in FIG. 1 in generating and outputting a corrected loss value.

FIG. 4 is a flow diagram illustrating one example of the operation of architecture 100 (shown in FIG. 1) in generating corrected loss signal 160, during the runtime operation of machine 102. It is first assumed that machine 102 is performing a harvesting operation and that the grain loss sensors 130-132 are providing grain loss sensor signals. Thus, grain loss correction system 126 first detects the sensor loss signals. This is indicated by block 300. It will be noted that the grain loss sensor signals 130-132 can actually comprise a single sensor 302 (or a single, aggregate signal from multiple sensors), or it can include multiple sensors 304 that each provide an individual sensor signal. Of course, other combinations of sensors and sensor signals 306 can be used as well.

Correction component 138 then detects the machine context information provided by one or more of context sensing components 128. This is indicated by block 308.

Correction component 138 then accesses knowledge base 136 using the context information. This is indicated by block 310. It obtains corrected loss values that can be applied to the sensor signals. This is indicated by block 312.

Correction component 138 then applies those values and outputs the corrected loss signal 160. This is indicated by block 314. As mentioned above, the corrected loss values can be adjustment values that are applied to the sensed loss values to correct them. They can be a series of values and calculations. They can be the corrected values themselves (such as values received from an interactive correction model), or other values.

The correction loss signal can be output to a variety of different systems or components, for a variety of different uses. For instance, it can be surfaced for the user to inform the user of the corrected grain loss, and for user interaction, as indicated by block 316. By way of example, if the corrected grain loss signal is below a desired value, it may provide options that can be selected by the user to reduce grain loss. As one example, the grain loss may be displayed on a user interface display, along with user input mechanisms that can be actuated to see suggested operational changes that the user can make to reduce grain loss. In that case, the user can actuate the user input mechanism and view the suggested operational changes. This is but one example of how the corrected loss signal 160 can be surfaced for the user and for user interaction.

Signal 160 can also be provided to control system 118 where it can be used to automatically control one or more of the various controlled systems 120 on machine 102 in order to reduce grain loss. The automation can take place without informing the operator, in conjunction with informing the operator, or after operator authorization is received or otherwise.

It can also be provided through communication component 116 to one or more remote systems 110. The remote systems can display the grain loss, in near real time, for a person at the remote system, or it can store the corrected loss signal 160 for further analysis, for mapping, or for a wide variety of other reasons. System 126 can output the corrected loss signal 160 to other components or systems 318 as well.

In one example, grain loss correction system 126 intermittently repeats the process of detecting context with components 128 and generating corrected loss signal 160. It can do so periodically, when triggered by changing context information, or based on other criteria. As one example, it may be that the context information indicates that when the operator starts harvesting with machine 102, the crop is relatively moist. However, later in the day, or later in the harvesting operation, it may be that the crop or material other than grain dries out. When such a contextual change is detected, system 126 can repeat the process of generating the corrected loss signal 160, based upon the new context information. Determining whether it is time to repeat the correction operation is indicated by block 320. If so, processing reverts to block 300. If not, then system 126 waits until either it is time to repeat the correction operation, or until the harvesting operation ends. This is indicated by block 322.

The present discussion has mentioned processors or servers. In one example, the processors or servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the remote systems 110 can be in a remote server environment (e.g., the cloud or otherwise).

Figure 5:
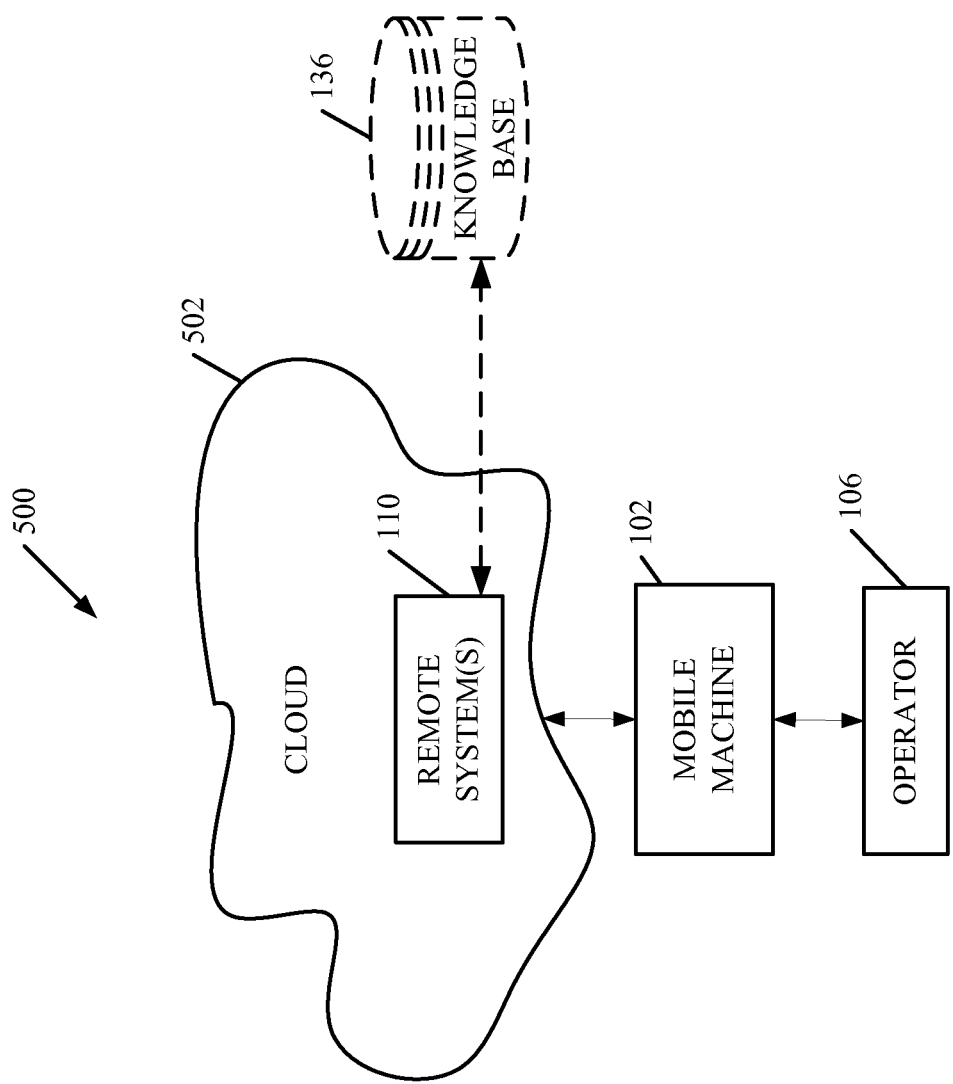
FIG. 5 is a block diagram of one example of a remote server environment.

FIG. 5 is a block diagram of harvester 102, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that remote system 110 and knowledge base 136 can be located at a remote server location 502. Therefore, harvester 102 accesses those systems through remote server location 502.

FIG. 5 also depicts another example of a remote server architecture. FIG. 5 shows that it is also contemplated that some elements of FIG. 1 are disposed at remote server location 502 while others are not. By way of example, knowledge base 136 or remote systems 110 can be disposed at a location separate from location 502, and accessed through the remote server at location 502. Regardless of where they are located, they can be accessed directly by harvester 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, various different kinds of computers, tablet computers, or other mobile devices, such as palm top computers, cell phones, smart phones, multimedia players, personal digital assistants, etc.

Figure 6:
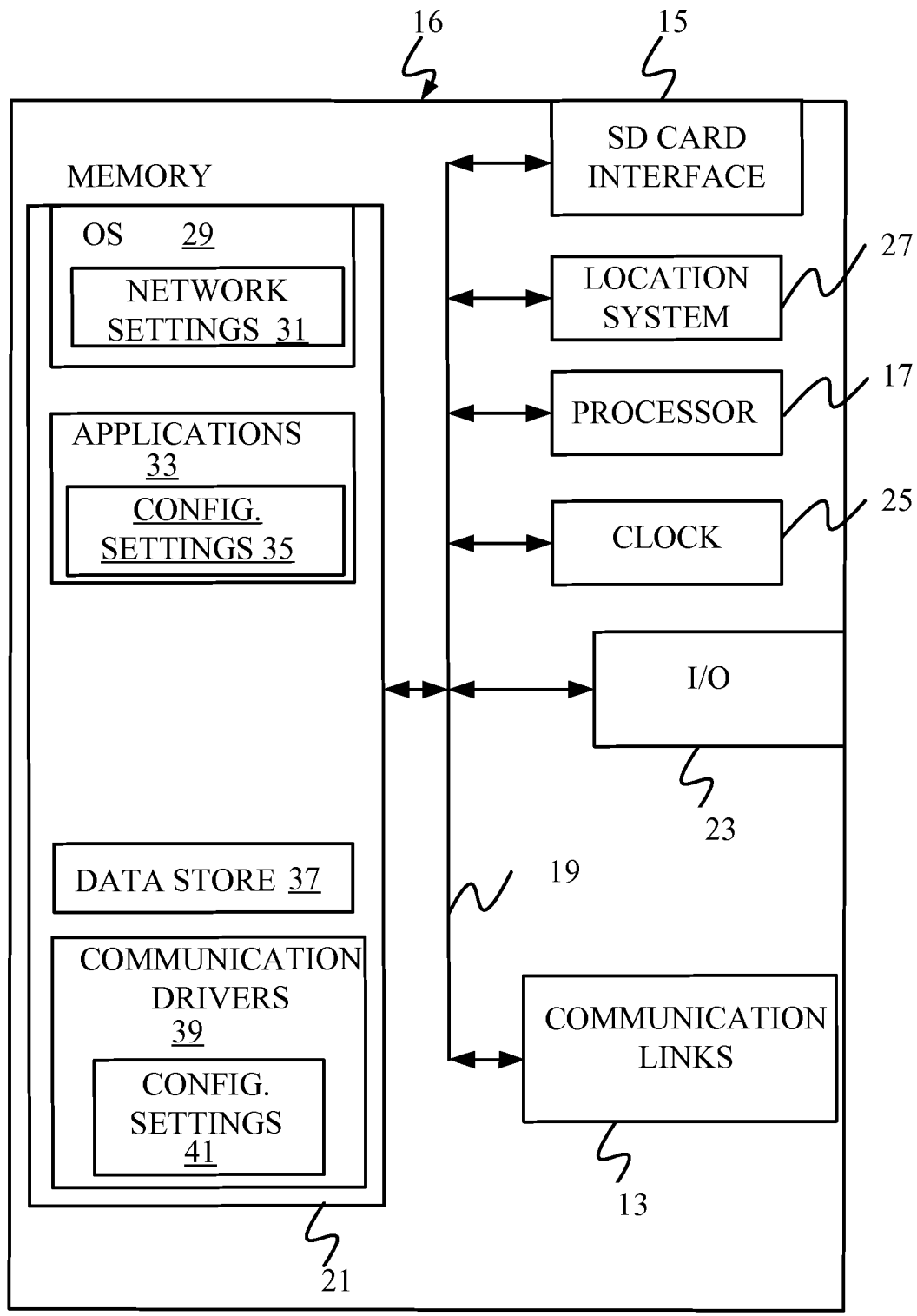
FIGS. 6-8 show examples of mobile devices that can be used in the architectures shown in the previous figures.
Figure 7:
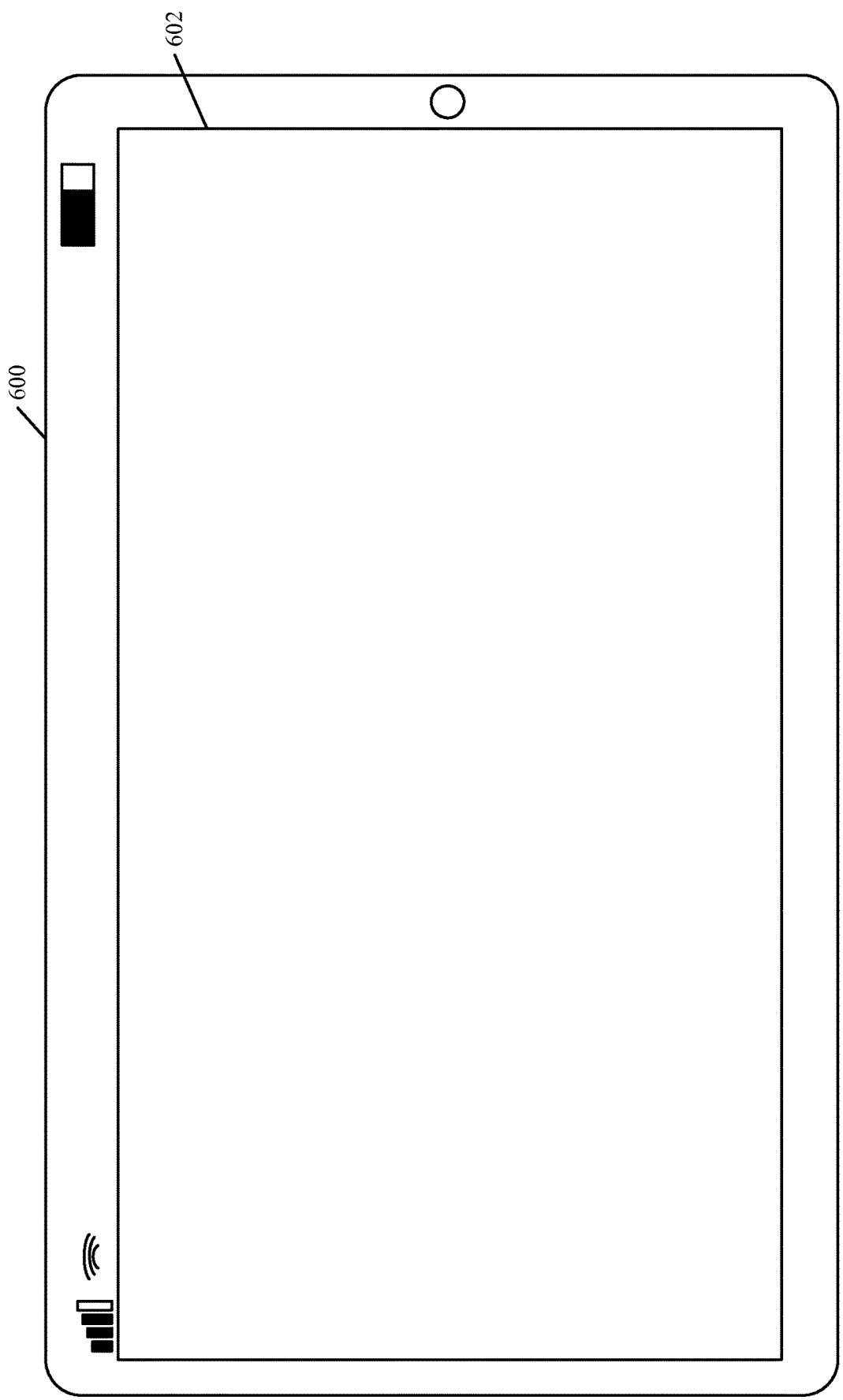
Figure 8:
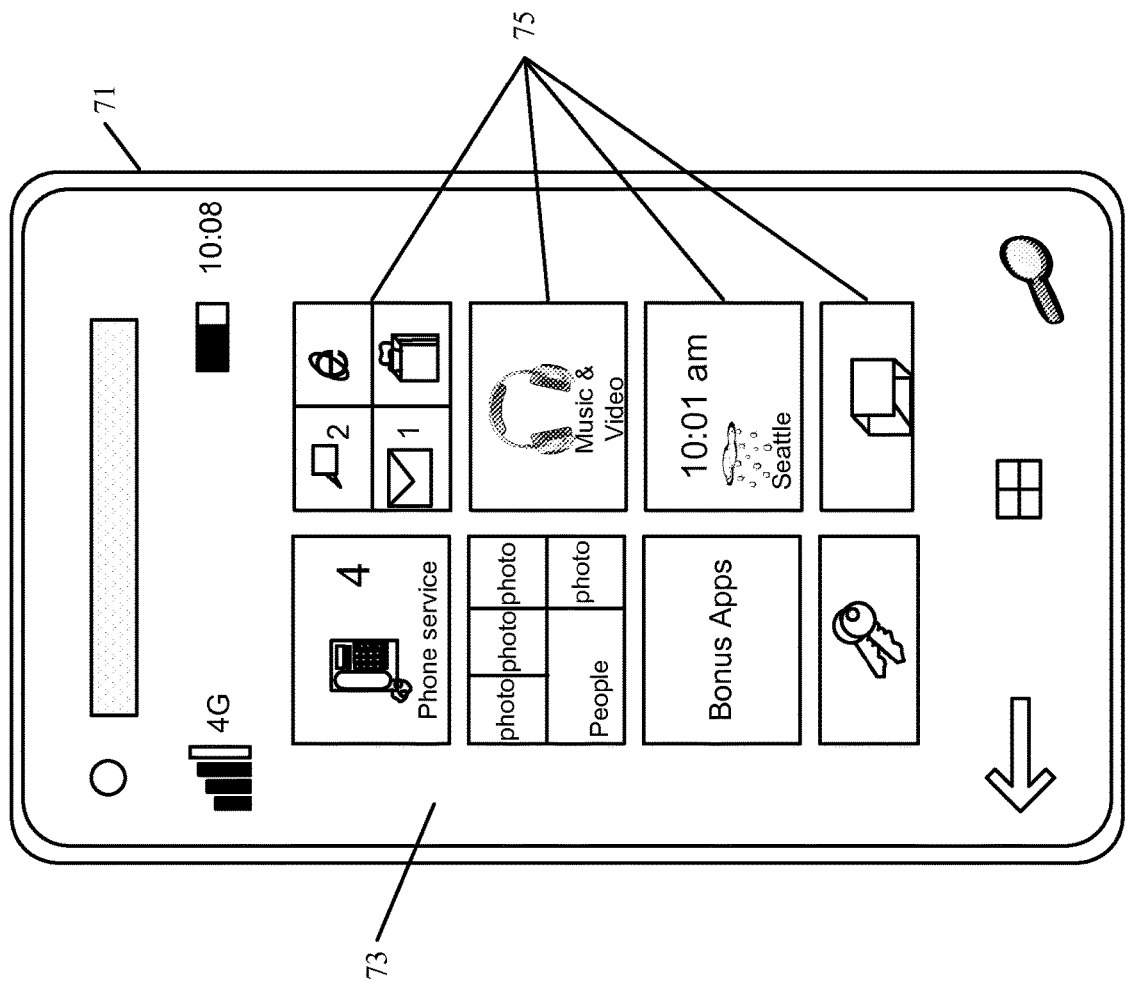
Figure 9:
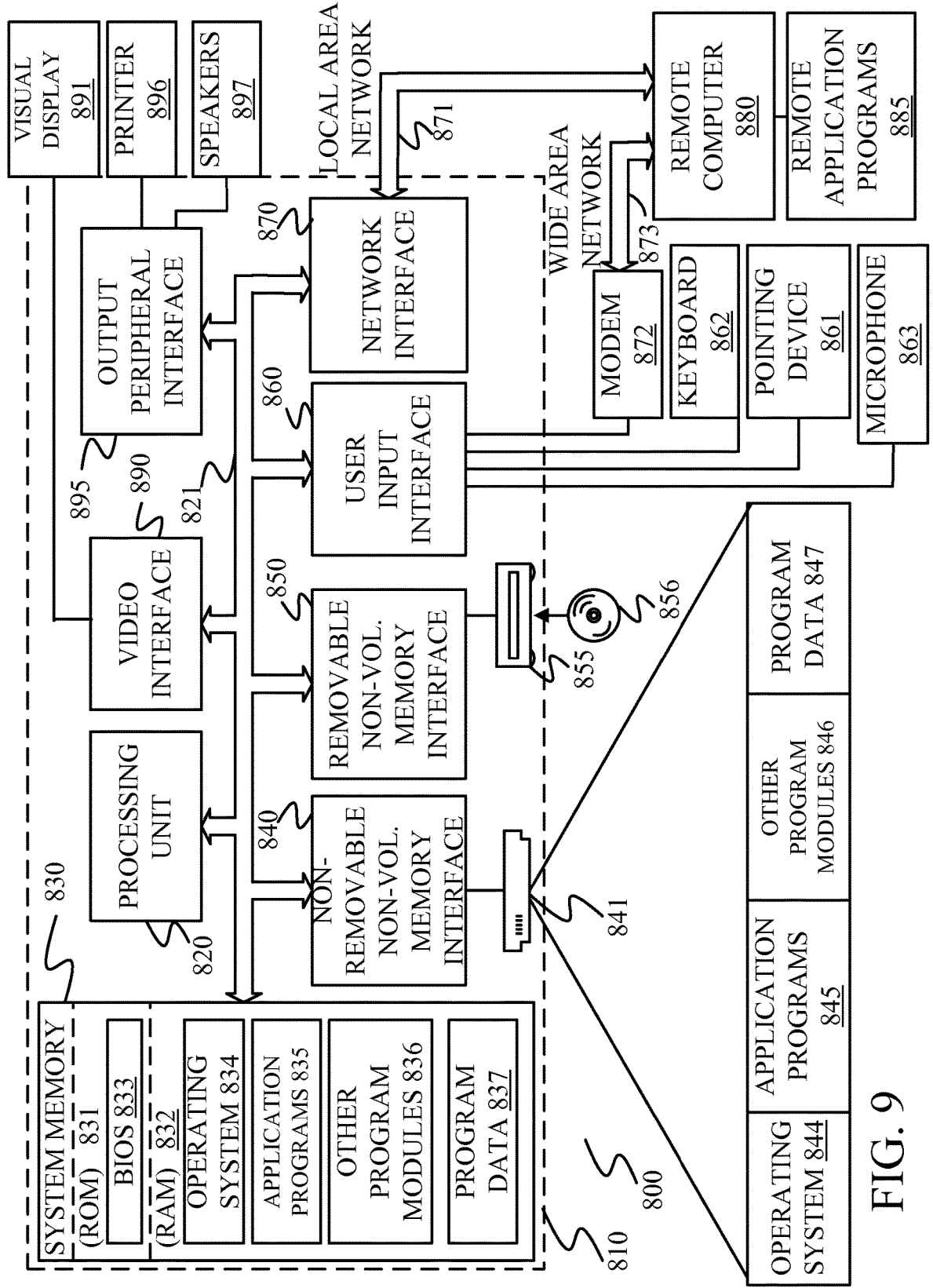
FIG. 9 is a block diagram of one example of a computing environment that can be deployed in any of the architectures shown in previous figures.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 102 for use in generating, processing, or displaying the corrected grain loss. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 114 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that device 16 can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 1, or parts of it, (for example) can be deployed. With reference to FIG. 9, an example system for implementing some embodiments includes a generalpurpose computing device in the form of a computer 810. Components of computer 810 may include, but are not limited to, a processing unit 820 (which can comprise processor 114), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, a cab area network—CAN, or wide area network—WAN) to one or more remote computers, such as a remote computer 880.

When used in a LAN networking environment, the computer 810 is connected to the LAN 871 through a network interface or adapter 870. When used in a CAN environment, computer 810 is connected through a suitable interface and wired or wireless connection. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
   a harvesting mechanism that harvests a crop;
   a crop processing system that processes the harvested crop through the mobile machine, wherein the crop processing system is configurable in a first configuration state in which the crop processing system chops residue material and in a second configuration state in which the crop processing system drops residue material in a windrow;

a crop loss sensor that generates a crop loss sensor signal indicative of crop loss sensed during harvesting;

a machine state sensor that generates a machine state signal indicative of whether the crop processing system is in the first configuration state or the second configuration state; and a crop loss correction system that generates a corrected loss signal based on the crop loss sensor signal and the machine state signal.

2. The mobile machine of claim 1 Wherein the crop loss correction system comprises:

a knowledge base that stores corrective elements; and a correction component that accesses the knowledge base based on the machine state signal to identify a set of the corrective elements and generates, the corrected loss signal based on the crop loss sensor signal and the identified set of corrective elements.

3. The mobile machine of claim 2 wherein the corrective elements comprise:

correction values stored in a lookup table indexed based on context information represented by the machine state signal.

4. The mobile machine of claim 1, and further comprising:

a context sensor that generates a context information signal, wherein the crop loss correction system generates the corrected loss signal based on the context information signal.

5. The mobile machine of claim 4 wherein the crop comprises grain.

6. The mobile machine of claim 5 wherein the context sensor comprises:

a moisture sensor that senses a moisture of material other than grain in the mobile machine, the crop loss correction system generating the corrected loss signal based on the sensed moisture.

7. The mobile machine of claim 4 in wherein the crop processing system comprises:

a cleaning shoe with a cleaning shoe fan, wherein the context sensor includes a fan speed sensor that senses a speed of the cleaning shoe fan, the sensed configuration state indicating the sensed speed of the cleaning shoe fan.

8. The mobile machine of claim 4 wherein the context sensor comprises:

a machine orientation sensor that senses an orientation of the mobile machine, the crop loss correction system generating the corrected loss signal based on the sensed orientation.

9. The mobile machine of claim 1 and further comprising:

a user interface device; and a user interface component that controls the user interface device to generate a user interface based on the corrected loss signal.

10. The mobile machine of claim 1 and further comprising:

a controlled system that performs a mechanical function on the mobile machine; and a control system that controls the controlled system based on the corrected loss signal.

11. The mobile machine of claim 1 and further comprising:

a communication system that communicates the corrected loss signal to a remote system, that is remote from the mobile machine.

12. A method of sensing crop loss in a harvester, the method comprising:

performing a harvesting operation with the harvester that harvests a crop;

sensing crop loss during the harvesting operation;

generating a crop loss sensor signal indicative of the crop loss sensed during the harvesting operation;

detecting whether the machine is in a first configuration state in which the harvester chops residue material or in a second configuration state in which the harvester drops residue material in a windrow;

generating a context information signal, indicative of whether the harvester is in the first configuration state or the second configuration state; and generating a corrected loss signal based on the crop loss sensor signal and the context information signal.

13. The method of claim 12 wherein generating the corrected loss signal comprises:

accessing a knowledge base based on the context information signal to identify a set of corrective values; and generating the corrected loss signal based on t le crop loss sensor signal and the identified set of corrective values.

14. The method of claim 12 performing a harvesting operation comprises:

performing a cleaning operation with a cleaning shoe and a cleaning shoe fan, wherein generating a context information signal includes detecting a speed of the cleaning shoe fan, and wherein generating the corrected loss signal includes generating the corrected loss signal based on the detected speed of the cleaning shoe fan.

15. The method of claim 12 wherein generating a context information signal comprises:

detecting an orientation of the mobile machine, wherein generating a corrected loss signal includes generating the corrected loss signal based on the detected orientation.

16. The method of claim 12 wherein the crop comprises grain, and wherein generating the context information signal comprises:

detecting a moisture of material other than grain in the mobile machine, wherein generating the corrected loss signal includes generating the corrected loss signal based on the detected moisture.

17. The method of claim 12 and further comprising at least one of controlling a user interface device to generate a user interface based on, the corrected loss signal;

controlling a controlled system on the mobile machine based on the corrected loss signal; or communicating the corrected loss signal to a remote system, that is remote from the mobile machine.

18. A mobile machine comprising:

a harvest mechanism configuration to harvest a crop, wherein the mobile machine is configurable in a first configuration state in which the mobile machine chops residue material and in a second configuration state in which the mobile machine drops the residue material in a windrow;

a crop loss sensor configured to generate a crop loss sensor signal indicative of crop loss sensed during harvesting;

a machine state sensor configured to generate a context information signal that indicates whether the mobile machine is in the first configuration state or the second configuration state; and a crop loss correction system configured to generate a corrected loss signal based on the crop loss sensor signal and the context information signal.

19. The mobile machine of claim 18, wherein the crop loss correction system comprises:
   a knowledge base that stores corrective elements; and
   a correction component that accesses the knowledge base based on the context information signal to identify a set of the corrective elements and generates the corrected loss signal based on the crop loss sensor signal and the identified set of corrective elements.

20. The mobile machine of claim 19, wherein the corrective elements comprise
   correction values stored in a lookup table indexed based on context information represented by the context information signal.

\* \* \* \* \*